United States Patent [19]

Meader, Jr. et al.

[11] 3,900,687

[45] Aug. 19, 1975

[54] PROCESS FOR COATING A SURFACE AND THE COATED SURFACE

[75] Inventors: Arthur L. Meader, Jr., Berkeley; William L. Runyon, Jr., Richmond, both of Calif.

[73] Assignee: Chevron Research Company, San Francisco, Calif.

[22] Filed: Sept. 10, 1973

[21] Appl. No.: 396,042

[52] U.S. Cl. .............. 428/425; 404/32; 404/75; 427/138; 427/407; 427/417; 428/489; 428/539
[51] Int. Cl. ...................... E01c 7/35; B44d 1/14
[58] Field of Search ........ 117/72, 92, 123 D, 123 E, 117/161 KP; 181/33 GA; 404/32, 75

[56] References Cited
UNITED STATES PATENTS

| | | | |
|---|---|---|---|
| 3,110,981 | 11/1963 | Larner | 117/123 D X |
| 3,253,521 | 5/1966 | Endres | 404/32 X |
| 3,272,098 | 9/1966 | Buchholtz et al. | 117/161 KP X |
| 3,394,094 | 7/1968 | Kayser | 117/92 X |
| 3,499,783 | 3/1970 | Nelson et al. | 117/72 |
| 3,756,845 | 9/1973 | Zasadny et al. | 117/72 |

*Primary Examiner*—Ralph Husack
*Attorney, Agent, or Firm*—G. F. Magdeburger; C. J. Tonkin; B. G. Fehringer

[57] ABSTRACT

A water-proofing/sound-proofing coating composition comprises, in order, from a surface to be coated (A) an adhesion promoter, (B) a seal coat comprising (1) a polyurethane (2) a heat absorber, (3) a nonvolatile extender, (4) a volatile solvent, and (5) an inert filler, and (C) a membrane coat comprising (1) a polyurethane formed from (a) a mixture of high molecular weight polyols and low molecular weight chain stiffeners and (b) a polyisocyanate, (2) a nonvolatile extender and (3) a volatile solvent. The surfacing composition can also include an overlay of a wearing surface such as an asphalt concrete. A process is also provided for preparing a cast-in-place surfacing composition comprising (A) applying a primer to a surface to be coated, (B) applying a seal-forming coat to a primed surface, (C) allowing the seal-forming coat to stand for a time sufficient to allow entrained gases to escape from the seal-forming coat and the primed surface, and (D) applying to the surface of the seal-forming coat a membrane-forming coat comprising (1) a mixture of a high molecular weight polyol and a low molecular weight chain stiffener, (2) a substantially inert nonvolatile extender, (3) a polyisocyanate, (4) a volatile solvent, and (5) a polyurethane-forming reaction catalyst.

15 Claims, No Drawings

PROCESS FOR COATING A SURFACE AND THE COATED SURFACE

BACKGROUND OF THE INVENTION

Field of the Invention

A common problem in areas where freezing temperatures occur is a tendency for bridges to freeze over while the roads on either side of the bridge remain unfrozen. This is because the bridge deck cools very quickly while the roadbed is both insulated and warmed by the earth upon which it rests. Since bridge decks freeze over sooner than the rest of the highway, the unwary motorist is faced with a very real hazard.

To combat the hazard presented by frozen bridge decks, highway maintenance crews often spread a salt such as sodium chloride or calcium chloride on the surface of the bridge. While salting reduces this hazard, it creates the problem of salt water. Bridge decks, normally constructed with Portland cement concrete, are somewhat porous. The salt water diffuses into this porous material. When it reaches the metal reinforcing bars within the concrete, corrosion occurs. Corrosion causes an increase in volume of the reinforcing metal. The resulting pressure on the concrete results in pop-outs and delaminations, sometimes over very large areas. The salt water also causes scaling which is a form of surface erosion. When the damage is severe enough, complete reconstruction of the bridge deck is required. This can involve removal of the old bridge deck and replacement with an entirely new deck. Where concrete supporting pillars are used, complete demolition and reconstruction of the bridge may be necessary.

Similar problems occur wherever decks and the like are supported above ground and are exposed to freezing temperatures such as in multilevel car parking facilities.

Since the major problem is salt water seeping into the porous structure, sealing coats have been applied to bridge decks and the like to "seal out" the salt water. A problem experienced in applying these seal coats is bubble formation in the coating. This problem is particularly severe with concrete containing high percentages of entrained air. Before the mid-1960's concrete bridge decks contained very little air, usually less than 4%. Since then, concrete, particularly that used to form bridge decks, was required to have about 6 to about 6.5% entrained air to provide resistance to scaling. Seal coats applied over concrete containing these high percentages of air suffer sever air bubble formation problems. The bubbles are very difficult to remove and in most cases their removal destroys the integrity of the seal coat. On the other hand, if the bubbles are not removed the seal coat is considerably weakened at these points.

Bubble formation is not such a sever problem with preformed membranes which are "glued" into place. However, these require considerable labor, are subject to wrinkling problems during application and in some cases are subject to adhesion problems with asphalt concrete overlays.

What is needed is a low cost sealing composition which is inexpensive to install, tough, impermeable to salt water and not subject to bubble formation.

This invention is directed toward such a surfacing composition for bridge decks and the like. It is competitive in cost with other seal coat systems, tough, durable, impermeable to salt water and subject only to very minimal bubble formation. In addition when applied to surfaces, whether or not porous, it provides an excellent sound deadening effect.

SUMMARY OF THE INVENTION

A cast-in-place surfacing composition is provided which comprises, in order, from a surface to be coated: (A) an adhesion promoter, (B) a seal coat comprising (1) a polyurethane, (2) a heat absorber, (3) a substantially inert nonvolatile extender, (4) a volatile solvent, and (5) an inert filler, and (C) a membrane coat comprising (1) a substantially inert nonvolatile extender, (2) a volatile solvent, and (3) a polyurethane formed by reacting a mixture of a high molecular weight polyol and a low molecular weight chain stiffener with a polyisocyanate.

A process is provided for preparing the cast-in-place surfacing composition which comprises (A) applying a primer to the surface to be coated, (B) applying a seal-forming coat to the primed surface which comprises (1) a polyurethane precursor, (2) a heat absorber, (3) a substantially inert nonvolatile extender, (4) a volatile solvent, and (5) an inert filler, (C) allowing the seal-forming coat to stand for a time sufficient to allow entrained gases to escape from the seal-forming coat and the primed surface and (D) applying a membrane-forming coat to the seal-forming coat which comprises (1) a substantially inert nonvolatile extender, (2) a polyurethane precursor comprising a mixture of a high molecular weight polyol and a low molecular weight chain stiffener, (3) a polyisocyanate (4) a volatile solvent, and (5) a polyurethane-forming reaction catalyst.

If the coated surface is subject to heavy wear such as heavy vehicular traffic, snow plowing, tire chains or other severe abuse, a wearing surface should be applied over the membrane coat. Particularly on bridges, asphalt concrete provides an excellent wearing surface.

In light use areas such as parking decks and in sound deadening applications the highly durable membrane coat provides a satisfactory wearing surface.

DETAILED DESCRIPTION OF THE INVENTION

The cast-in-place surfacing composition of the invention comprises, in order from the coated surface, (A) an effective amount of an adhesion promoter, (B) a seal coat comprising 15 to 50, preferably 25 to 30 parts by weight of (1) a polyurethane formed by reacting 10 to 40, preferably 20 to 25 parts by weight of (a) a polyurethane precursor with 3 to 12, preferably 6 to 7.5 parts by weight of (b) a polyisocyanate, 2 to 10, preferably 2–5 parts by weight of (2) a heat absorber, 25 to 75, preferably 40 to 60 parts by weight of (3) a substantially inert nonvolatile extender, 0 to 25, preferably 0 to 20 parts by weight of (4) a volatile solvent, and 10 to 40, preferably 20 to 30 parts by weight of (5) an inert filler, and (C) a membrane coat comprising 20 to 80, preferably 40 to 60 parts by weight of (1) a polyurethane formed by reacting 15 to 60, preferably 30 to 55 parts by weight of (a) a polyurethane precursor with 6 to 20, preferably 10 to 15 parts by weight of (b) a polyisocyanate, 20 to 80, preferably 40 to 60 parts by weight of (2) a substantially inert nonvolatile extender, and 0 to 20, preferably 0 to 10 parts of (3) a volatile solvent. The polyurethane precursor of the seal coat comprises a mixture of 8 to 34, preferably 15 to 20 parts by weight of a high molecular weight polyol and 0 to 8, preferably 0 to 4 parts by weight of a low moelcular weight chain stiffener. The polyurethane precursor of the membrane coat comprises a mixture of 15 to 60, preferably 30 to 55 parts by weight of a high molecular weight polyol and 2 to 10, preferably 4 to 8 parts by weight of a low molecular weight chain stiffener.

In a preferred embodiment the cast-in-place surfacing composition of the invention includes, in addition to (A) the adhesion promoter, (B) the seal coat and (C) the membrane coat, (D) a tack coat and (E) a wearing surface overlay.

The process for preparing the cast-in-place surfacing composition of the invention comprises (A) applying an effective amount of a primer to the surface to be coated to promote adhesion, (B) applying a seal-forming coat to the primed surface which seal-forming coat comprises 10 to 40, preferably 20 to 25 parts by weight of (1) a polyurethane precursor, 2 to 10, preferably 2–5 parts by weight of (2) a heat absorber, 25 to 75, preferably 40 to 60 parts by weight of (3) a substantially inert nonvolatile extender, 0 to 25, preferably 0 to 20 parts by weight of (4) a volatile solvent, and 10 to 40, preferably 20 to 30 parts by weight of (5) an inert filler, (C) allowing the seal-forming coat to stand for a time (preferably ½ to 4 hours) sufficient to allow entrained gases to escape from the seal coat and from the primed surface, and (D) applying to the surface of the seal-forming coat a membrane-forming coat comprising 20 to 80, preferably 40 to 60, parts by weight of (1) a substantially inert nonvolatile extender, 15 to 60, preferably 30 to 55 parts by weight of (2) a polyurethane precursor, (3) 6 to 20, preferably 10 to 15 parts by weight of a polyisocyanate, 0 to 20, preferably 0 to 10 parts by weight of (4) a volatile solvent, and (5) 0 to 2, preferably 0.01 to 1.0 parts by weight of a polyurethane-forming reaction catalyst, in which the polyurethane precursors of the seal coat and membrane coat are as described above.

The surfacing compositions of the invention are prepared by applying an adhesion promoter to the surface to be coated. Application is conveniently by spraying a solution of the primer in a volatile solvent. Preferably the solvent evaporates within about one-half hour after application under normal working conditions (e.g., above 50°F).

After the primer has dried a thin seal-forming coat of 10–30 mils, preferably 15–25 mils in thickness is applied to fill the pores in the surface and prevent bubbling in the membrane. This seal-forming coat comprises a polyurethane precursor, a heat absorber, and a substantially inert nonvolatile extender. It does not contain a polyisocyanate. Accordingly, this seal-forming coat cannot cure into a polyurethane. It remains fluid and self-leveling. As air bubbles arise from the porous bridge deck or other surface and form bubbles in the seal-forming coat, the bubbles can burst and the seal-forming coat heal itself to maintain its impermeable integrity. The seal-forming coat is later cured into a polyurethane by diffusion of some of the polyisocyanate from the membrane-forming coat into the seal-forming coat.

The seal-forming coat contains a dark, preferably black filler, such as carbon black, black iron oxide, or asphalt, which acts as a heat absorber. Preferably it is applied on a sunny day. The black material absorbs heat from the sun's radiation raising the surface temperature by as much as 30°–40°F. The air in the bridge deck surface pores will then be rapidly driven out through expansion caused by the heating. When the membrane coat is applied over the dark colored seal-forming coat the temperature of the surface either remains constant or starts to fall. If sufficient time has elapsed to allow the air to escape, there will be no further expansion of air within the concrete deck, and as the temperature starts to fall, there will actually be a contraction of the air in the concrete. The contracting air does not cause bubbles and blisters in the membrane coat as it cures. Most preferably the seal-forming coat is applied in the middle to late afternoon when the sun is still high enough in the sky to heat the surface rapidly but soon will be low enough in the sky that the temperature starts to decrease, thus causing contraction of the air in the surface pores and minimizing bubble formation. These falling temperature applications yield excellent, nearly bubble-free coatings.

After the seal-forming coat is applied and allowed to stand for a sufficient time to allow the entrained air in the seal-forming coat material itself and on the bridge deck surface to escape, a membrane-forming coat is applied over the seal-forming coat. The membrane-forming coat contains a substantially inert nonvolatile extender and polyurethane-forming materials. The polyurethane-forming materials include a high molecular weight polyol and a low molecular weight chain stiffener. In addition a polyioscyanate and a polyurethane-forming reaction catalyst are present. The quantity of polyisocyanate is adjusted such that there are sufficient isocyanate groups to react not only with the isocyanate reactive groups of the polyol and chain stiffener of the membrane-forming coat, but also to diffuse into the seal-forming coat and react with the isocyanate reactive groups of the materials in that coat.

The membrane-forming coat is applied at a thickness of about one-fiftieth to about one-half inch, preferably one thirty-second to about three-eighths inch, more preferably about one-twentieth to one-fourth of an inch.

Preferably, when the membrane will be subjected to heavy wear, such as on highway bridges and the like, a protective surface is applied after the membrane coat cures. Asphaltic concrete provides an excellent protective surface. It can be applied in any suitable form such as a hot mix or an emulsion mix. Preferably it is applied as a hot mix, but the temperature should not exceed 400°F and preferably not be above 325°F. The thickness of the protective surface used will depend on a variety of considerations, one of which is the dead weight which the surfacing composition represents. For example, on bridges, it is very desirable to minimize the dead weight which the bridge must support. For most of the surfacing operations on bridge decks two lifts 1 ½ inches thick of asphaltic concrete are preferred. This provides a highly durable wearing surface without increasing the dead weight on the bridge excessively.

A tack coat should be used to improve adhesion of the asphaltic concrete to the membrane coat. Any material which accomplishes this objective is suitable. A thin coat of an asphalt sprayed on in the molten state has been found to be a very satisfactory tack coat. The tack coat application temperature also should not exceed 400°F, preferably 325°F. Suitable asphalts have penetration values of 50–150 at 77°F., and preferably 70–110. A particularly useful asphalt is one having a penetration of 85/100.

Immediately following application of the tack coat, preferably while it is still tacky, a hot asphaltic concrete mix is applied according to standard paving techniques which usually includes compaction after each lift is applied. The total thickness of the protective surface can be built up as desired. Preferably, the asphalt concrete comprises 4 to 7 parts by weight of an asphalt having a penetration of 70 to 150 and 93 to 96 parts by weight of a mineral aggregate.

The Primer or Adhesion Promoter

The primer or adhesion promoter is any material which improves the adhesion between the seal coat-membrane coat and the underlying surface. Materials which have been found to be highly suitable for this purpose are silicone compounds, especially those having 2 or 3 hydrolyzable groups attached to a silicon atom, and which have attached to the silicone molecule at least one group such as hydroxyl or amino group which will react with an isocyanate. Examples of suitable primer or adhesion promoters are N(beta-aminoethyl)-gamma-aminopropyltrimethoxysilane, gamma-aminopropyltriethoxysilane, gamma-glycidoxy propyl trimethoxysilane, and gamma-mercaptopropyl-trimethoxysilane.

If a silane is used, the silicon atom should have 2 and preferably 3 hydrolyzable groups. If silicone oligomers are used, the numer of hydrolyzable groups may be as low as 1 per silicon atom in the oligomer; preferably there will be 2 hydrolyzable groups present per silicon atom.

The primer or adhesion promoter is applied in a dilute solution at about ½–2 gallons per 300 nominal sq. ft. of porous Portland cement concrete base to be treated. By "nominal sq. ft." is meant the gross area of the base. This is the area obtained by using a measuring tape and not the surface area which takes into account the porosity of the cement surface. Portland cement concrete has a true surface area of 3–4 or even more sq. ft. of surface area per sq. ft. of nominal surface area. To be most effective, the adhesion promoter should be applied in a monomolecular layer over the true surface area (not the nominal surface area) to be coated. Furthermore, the surface should be substantially free of surface moisture.

Preferably the primer or adhesion promoter solution is applied by spraying with the proper choice of solvents. The sprayed surface will dry in about 5 min. to about 2 hours depending on ambient conditions.

The solvent for the primer or adhesion promoter can be any solvent which is substantially inert towards the primer or adhesion promoter itself. Preferably the solvent is relatively volatile and has a boiling point of less than about 130°C. Suitable solvents include benzene, toluene, xylene, methyl ethyl ketone, methyl n-butyl ketone, n-butyl acetate, and the like. Depending on local air pollution controls other solvents may be required. Since these solvents are flammable appropriate fire prevention measures should be taken.

Seal Coat

The seal-forming coat is applied to the porous sub-base after the adhesion promoter has dried to close the pores and prevent bubbling of the membrane. This coat should have a viscosity of from 2,000 to 50,000 centipoise, preferably 5,000 to 20,000 centipoise at 77°F. If the viscosity is less than 2,000 centipoise it will not bridge the pores of the base as required, but will penetrate into the base and fail to seal. If the viscosity is above 50,000 centipoise air will not be able to escape and blisters or bubbles in the seal coat will result.

The seal-forming coat is applied in a relatively thin layer so that the air bubbles can easily reach the surface and burst. Under normal conditions on a normally porous surface (concrete having up to 6–7% entrained air), about 0.1 gallon per sq. yd. of nominal surface area yields satisfactory results. Of course, a rougher or more porous surface will require more and a smooth surface will require less of the seal-forming coat.

The preferred seal-forming coats of this invention contain polyurethane precursors such as the high molecular weight polyols and low molecular weight chain stiffeners described below under those headings. These polyols may be blended with other materials to yield an extended polyurethane. Suitable extenders include cut back asphalts and nonvolatile oils. These are described in more detail below under that heading.

It is important that the polyurethane ultimately formed from the seal coat have relatively good elongation properties and tensile strength. This ensures maintaining integrity of the seal coat layer during dimensional changes of the bridge, such as expansion and contraction, cracking, swinging, oscillating and the like.

Two specific preferred compositions have the following formulations:

SEAL COATS

| Material | Parts by Weight |
|---|---|
| Composition 1 | |
| A cut-back asphalt consisting of 80 volumes of 85/100 penetration asphalt and 20 volumes of a largely aliphatic low-boiling petroleum hydrocarbon having the midpoint of its boiling range at 265°F. | 80 |
| Polybutadiene diol (average molecular weight, 2,500–2,800) sold by Arco Chemicals, Inc., as ARCO Poly BD Resin R45-M | 17.9 |
| Composition 2 | |
| Largely aromatic hydrocarbon blend boiling in the lube oil range | 51.5 |
| Carbon Black | 2.5 |
| Polybutadiene diol (average molecular weight 2,500–2,800) sold by Arco Chemicals, Inc., as ARCO Poly BD Resin R45-M | 18 |
| N,N-bis(2-hydroxypropyl) aniline | |

Membrane Coat

Preferred membrane coats have certain properties. The membrane should cure completely even when applied in relatively thick layers (up to about 1 inch). The membrane should not be dependent upon loss of solvent or water or upon absorption of moisture or other gases from the atmosphere for its cure. Two-part urethanes are particularly good in this respect. The membrane material after cure must also have good tensile strength, good elongation properties, and high tear strength. Furthermore, these properties must be exhibited over temperatures ranging from −20°F, and even lower, to 140°F (the temperature reached by black highway surfaces in the summer sun). Further, the material must be capable of withstanding application of hot protective surfaces such as hot-mix asphalt concretes, which are applied at temperatures up to 325°–400°F. The material must also form a good bond with the seal coat and with the intended protective surface overlays such as the asphaltic concrete.

Membranes which satisfactorily meet these requirements are comprised of from 35 to 65 parts of a suitable extender and from 65 to 35 parts of a polyurethane. Fillers may be added as desired to fulfill other requirements. For instance, carbon black can be added to improve ultraviolet resistance where a protective surface is not applied. Calcium oxide or similar materials can be used as a desiccant to prevent foaming of the polyurethane caused by reaction of the polyisocyanate with any water present. Clay may be added to improve tear strength. In addition small amounts of catalyst may be used to promote the polyurethane-forming reaction.

The Extender

A variety of cut back asphalts are suitable. Cut back asphalts are mixtures of asphalt and a volatile solvent. Suitable asphalts include those having penetrations of from 40 to about 200 preferably 50 to about 150. A particularly useful asphalt for use in this invention is one having a penetration of 85/100 at 77°F. The solvents used in preparing cut back asphalts are generally volatile; that is, they usually have boiling points such that they evaporate from the asphalt within a short period after the asphalt cut back is spread out to form a surface. Excellent, inexpensive cut back solvents are available as certain fractions from petroleum refining.

The polyurethane precursors can be mixed with an extender oil instead of, or in addition to, the cut back asphalt. A wide variety of extender oils are suitable for this purpose. The oil should not bleed or exude from the polyurethane ultimately prepared from the polyols. It also must be compatible with the polyol and other constituents added thereto. Oils having a substantial aromatic component are more miscible with the polyol component and the polyurethane ultimately prepared from it. Oils having an aniline point of from about 75 to about 140°F. are preferred. A particularly useful extender oil is the extract from a side cut in the manufacture of lube oils wherein phenol is used to extract aromatics. The resulting extract has a viscosity of about 2100 SUS at 100°F., and an aniline point of 100°F.

A particularly preferred extender for the seal coat and membrane coat is a cut back asphalt consisting of 80 volumes of 85/100 penetration asphalt, and 20 volumes of a largely aliphatic low-boiling petroleum hydrocarbon having the midpoint of its boiling range at 265°F.

Volatile Solvent

The seal coat and membrane coat contain a volatile solvent to lower the viscosity of the yet uncured polyurethane mixture sufficiently to improve its handling characteristics and spreadability. Most of this solvent will ultimately evaporate from seal coat before application of the membrane coat and from the membrane coat during and after curing. Suitable solvents include the aliphatic low-boiling petroleum hydrocarbon mentioned above in the exemplary seal coat compositions as well as toluene, xylene, low boiling ketones such as methyl ethyl ketone and other low boiling aliphatic hydrocarbons such as hexane, heptane, cyclohexane and the like.

The Polyurethane

The polyurethane of the membrane coat is prepared by reacting a polyisocyanate with a polyurethane precursor. The precursor is a blend of a high molecular weight polyol and a low molecular weight chain stiffener. The low molecular weight moiety provides increased tensile strength, tear strength, and modulus.

The High Molecular Weight Polyols

The high molecular weight polyols are primarily diols, although there may be minor amounts of higher order polyols present. High molecular weight polyols will generally have at least a molecular weight of 1,500 and will not exceed a molecular weight of about 5,000. Preferably, they have a molecular weight ranging from about 2,000 to 4,000, and most preferably, from about 2,200 to 3,000. At least two of the hydroxyl groups will usually be at, or near (within about 4 carbon atoms of) the terminal carbon atoms, and will be separated by hydrocarbon chains of at least 40 carbon atoms. The hydrocarbon group is amorphous, that is relatively free of crystallizable areas.

The hydrocarbon chain can be readily prepared by polymerizing anionic addition polymerizable olefins using a metallo-organic catalyst. See, for example, Hayashi et al., *Journal of Polymer Science*, part A, 2, 2571–2594 (64) and U.S. Pat. No. 3,055,952. The hydroxyl groups may be introduced at the terminal ends of the polymer, by oxidation, or addition of aldehydes, ketones, or oxides. Preferably, the diols are primary alcohols. Free radical polymerization using hydrogen peroxide in an alcohol may also be used.

Polyols may be derived from such monomers as butadiene, styrene, isoprene, and alpha-methylstyrene, or t-butylstyrene, 2-ethylbutadiene, etc. Normally, the olefins will contain from about 4 to 10 carbon atoms. Preferably, the polymer is a polybutadiene.

The Low Molecular Weight Chain Stiffener

As stated above, the low molecular weight chain stiffeners are incorporated in the polyurethane to enhance the physical properties. These chain stiffeners include polyols, polyamines or hydroxyamines. They will generally have from about 2 to 12 atoms separating the most distant hydroxyl and/or amine groups and will normally contain from 4 to 18 carbon atoms. The atoms intermediate of the hydroxyl groups and/or amine groups, besides carbon, may be oxygen, nitrogen or sulfur. Generally they will contain from 0 to 2 hetero atoms.

Examples of suitable chain stiffeners include 3-dimethyl-amino-1,2-propanediol, 1,4-di-(hydroxymethyl) cyclohexane, 1,4-butanediol, 4,4'-methylenedianiline, diethanolamine, tolidine, 3-methyl-1,5-pentanediol, trimethylolpropane, glycerine, ethylene glycol, triethanolamine, diethyleneglycol, N,N,N',N'-tetra kis (2-hydroxypropyl) ethylenediamine and N,N-bis-(2-hydroxypropyl) aniline of which the last is preferred. The mol ratio of the isocyanate reactive groups of the low molecular weight chain stiffener to the isocyanate reactive groups of the high molecular weight polyol will range from 0 to 3:1, and preferably be about 1.5–2.5:1

Polyisocyanate

The polyisocyanates will generally be diisocyanates or mixtures of diisocyanates with higher orders of polyisocyanates, normally not exceeding 5 isocyanate groups. Usually, in mixtures of di- and higher order polyisocyanates, the higher order polyisocyanates will be present in not more than 50 equivalent percent, usually not more than 20 equivalent percent. Preferably, diisocyanates are used. The higher order polyisocyanates (greater than di-) have at least 12 carbon atoms and usually do not exceed 46 carbon atoms. The diisocyanates generally vary from about 6 to 24 carbon atoms.

Illustrative polyisocyanates include diphenyl diisocyanate, bis(isocyanatophenyl) methane, 1,5-naphthalene diisocyanate, polyphenyl polymethylene isocyanate (PAPI, supplied by Upjohn Co.), toluene diisocyanate (TDI), hexamethylene diisocyanate, dodecamethylene diisocyanate, 1,4-diisocyanatocyclohexene, poly (methylene phenylene polyisocyanate). The last polyisocyanate is preferred.

The ratio of isocyanate groups to isocyanate reactive groups (hereinafter referred to as the NCO/OH ratio) used to form the polyurethane in the membrane coat is normally in the range of 0.8–1.4/1.0, preferably 1.05–1.15/1.0. However, since the polyisocyanate to cure the polyurethane precursors of the seal-forming coat diffuses in from the membrane-forming coat, the membrane-forming coat must contain more isocyanate than the ranges expressed immediately above. To compensate for this diffusion of part of isocyanate out of the membrane-forming coat, the membrane-forming coat generally has an initial (before application over the seal-forming coat) NCO/OH ratio of 1.1–1.5/1.0, preferably 1.2–1.35/1.0. It will be recognized that since the polyisocyanate present in the seal-forming coat diffuses in from the membrane-forming coat, the exact NCO/OH ratio in the seal coat cannot be precisely defined but is preferably at least 0.5/1.0 and more preferably at least 0.6/1.0. The actual ratio is dependent on the polyisocyanate concentration in the membrane-forming coat, the rate of diffusion of the polyisocyanate, etc.

Catalyst

Catalysts, when used, are present in sufficient quantity to cause curing of the polyurethane as desired. The particular usage level is easily determined by simple experimentation. Generally the usage level will range from about 0.005 to about 0.2 weight percent of the total composition. Suitable catalysts include dibutyl tin dilaurate, diazabicyclooctane, stannous octoate, etc. The dibutyl tin dilaurate is preferred.

The Heat Absorber

The seal coat contains a heat absorber. This material causes absorption of heat radiation from the sun's radiation, thereby increasing the temperature of the surface to which it is applied. Suitable heat absorbers are dark in color, preferably black. The asphalt of the cutback asphalt extender is dark and functions as a heat absorber. Preferably this dark color is supplemented with another material such as carbon black, lamp black, black iron oxide, and the like.

Inert Fillers

The seal coat and membrane coat can include one or more inert fillers such as calcium carbonate, magnesium carbonate, clays, whiting, silica, calcium oxide, carbon black, etc. The latter two materials are also discussed under drying agents and heat absorbers, respectively.

Other Materials

Carbon black can be added to improve the ultraviolet resistance of the membrane coat. It can also be present in the seal coat to act as a heat absorber for warming the bridge deck.

Carbon black having a mean particle diameter of from about 10 to about 70 millimicrons is quite suitable for dispersion in the seal coat and membrane coat materials. Particularly preferred are carbon blacks having a mean particle diameter of from about 20 to about 55 millimicrons.

Dispersing the carbon black in the seal coat and membrane coat materials can be somewhat difficult due to its fine particle size. Preferably, it is introduced into the extender prior to addition of any other seal coat or membrane component. The extender and carbon black are then circulated through a high shear pump or colloid mill until complete dispersion is achieved.

Drying agents are advantageously used to minimize the amount of water present in the premix. The polyisocyanate reacts with the water and evolves carbon dioxide. Aside from the loss of the expensive polyisocyanate through this side reaction, the carbon dioxide can cause foaming and bubbling of the seal coat and membrane, a particularly disadvantageous result. Excellent drying agents include calcium oxide, calcium chloride, potassium carbonate, magnesium sulfate, calcium sulfate, synthetic zeolites (molecular sieves), etc.

In addition to the physical improvements which can be obtained by the use of the finely divided carbon black, other materials such as clay can be included for improved tear strength.

The membrane-forming coat materials can also include thixotropic agents. These agents can be any of the well-known materials sold for this purpose which are compatible with these extended urethanes. Another good thixotropic agent for these materials is the finely divided carbon black discussed above.

Yet another good thixotropic agent for polyurethane forming materials are polyureas formed from lower molecular mono- and di-amines and the polyisocyanates discussed above. These polyureas are particularly useful for spray applications on sloping surfaces using automatic two-component metering and mixing equipment. The premix includes the amine. When it is mixed with the polyisocyanate in the spraying equipment, the amine and polyisocyanate react very rapidly to produce the thixotropic agent. Generally, the great majority of the agent is formed by the time the mixture strikes the surface onto which it is being sprayed. The agent then prevents the runoff or slump of the membrane-forming coat.

Suitable amines for preparing these thixotropic agents include lower molecular weight mono- and di-amines containing from 6 to 30, preferably 12–22 carbons and 1 to 2 primary or secondary, preferably primary amine groups. Suitable amines include dodecylaniline, tall oil fatty amine, oleyl amine, and mixtures of two or more of these amines. One or more of these amines can also be used with small amounts of a diamine such as methyl imino bis-propylamine. Since the diamine as well as the polyisocyanate cause cross-linking of the various molecules which form the polyurea, a very small amount, generally about 5% weight of the monoamines, is sufficient to impart a significant amount of additional thixotropy to that provided by the monoamine-derived polyureas.

Premix Preparation

The seal coat and membrane coat are prepared by intimately mixing all the components of each of these materials. One method of accomplishing this is to bring each of the materials separately to the job site and mix them at this point. However, for convenience it is better to prepare a premix at a central location which is then activated with polyisocyanate at the job site.

The seal coat premix comprises the extender, the polyurethane precursor and the heat absorber. These can be blended with suitable mixing equipment.

A premix for the membrane coat comprises the extender, the high molecular weight polyol, the low molecular weight chain stiffener, the catalyst, fillers and the like. Usually only the polyisocyanate is not included. Generally, it is most convenient to disperse the fillers such as carbon black, clay and the like and the catalyst in the extender and thereafter blend in the high molecular weight polyol and the low molecular weight chain stiffener.

These premixes can then be brought to the jobsite in drums or tank trucks and used as needed. As discussed above, the seal-forming coat is applied without mixing any polyisocyanate with it.

The membrane-forming coat is prepared at the jobsite by mixing the premix with the polyisocyanate. This can be accomplished by any convenient mixing method, one of the most convenient being an ordinary cement or plaster mixer, particularly since they do not use any pumps, recirculating lines and the like which can be plugged by the cured membrane coat material. As discussed above, sufficient excess polyisocyanate is added to the membrane coat material to provide polyisocyanate to react with the high molecular weight polyol in the seal coat. This excess polyisocyanate should at least partially cure the polyol of the seal coat.

Both the seal coat and the membrane coat can be applied in a variety of ways. Conveniently the seal coat is applied with a squeegee having adjustable projections on the blade which hold the blade a fixed distance above the surface to be coated. When the membrane coat is mixed in a plaster mixer it also is conveniently applied by using a squeegee. Since the material is at least moderately self-leveling, small imperfections introduced by the squeegee and the blade projections will smooth out and become insignificant.

An alternative method of applying the seal coat and membrane coat materials is by spray application. The seal coat can be sprayed onto the surface. After the required interval when equilibrium between the entrained gases and the membrane has been achieved, the membrane coat is sprayed on. Most conveniently the membrane coat is applied with two-component automatic proportioning and mixing spray equipment. Using this equipment avoids the need to handle partially cured materials, as would be the case if the polyisocyanate is mixed with premix and then sprayed with single component spray equipment. Using two-component spray equipment also allows increasing the level of the catalyst and thereby decreasing the setting rate from several hours to as little as 3–5 minutes.

The following examples further illustrate the invention. All parts are by weight unless otherwise specified.

EXAMPLES

Example 1

A section of a concrete bridge deck is cleaned by sweeping with a stiff broom and then blowing all remaining loose material off with compressed air. The deck is then sprayed with a 0.1 percent solution of N(b-eta-aminoethyl)-gamma-aminopropyl trimethoxy silane in methyl-n-butyl ketone at a rate of about 380 sq. ft. per gallon. As soon as the solvent evaporates (about 15 minutes) a seal coat having the composition set forth in Table I below is sprayed on at a rate of about 0.035 gallons per square yard. The seal coat is allowed to stand in the direct sunlight for 1 hour after which it becomes noticeably warmer and many air bubbles escape from the bridge deck surface.

TABLE I

| SEAL COAT COMPOSITION | Parts |
|---|---|
| Extender Oil (largely aromatic hydrocarbon blend boiling in the lubricating oil range, viscosity about 2,100 SUS at 100°F, aniline point of about 100°F) | 51.3 |
| polybutadiene diol (average molecular weight 2500–2800) | 18.2 |
| N,N-bis-2-hydroxypropyl)aniline | 3.0 |
| calcium oxide | 4.5 |
| carbon black (mean particle size of 29 millimicrons) | 2.6 |
| calcined clay | 20.5 |

The membrane coat is then applied at a rate of 0.5 gallons per sq. yard (1/10 inch thickness) with two component metering, mixing and spraying equipment. The equipment is set to mix 100 parts of a premix with 13.5 parts of Jefferson Chemical Company's Thanate P–220. This is a polymeric polyisocyanate containing between 2.2 and 2.3 isocyanate groups per molecule. The composition of the premix is as shown in Table II below:

TABLE II

| MEMBRANE COATING PREMIX Component | Parts |
|---|---|
| A cut-back asphalt consisting of 80 volumes of 85/100 penetration as asphalt and 20 volumes of a largely aliphatic low-boiling petroleum hydrocarbon having the midpoint of its boiling range at 265°F. | 50 |
| Tall oil fatty amine | 0.65 |
| dodecyl aniline | 0.65 |
| polybutadiene diol (average molecular weight 2500–2800 | 42 |
| N,N-bis(2-hydroxypropyl)aniline | 6.7 |
| Dibutyl tin dilaurate | 0.01 |

The membrane is smooth and substantially free of bubbles and cured to touch in about 2 hours.

The following morning it is tack-coated with a light spray of 85/100 penetration asphalt applied at 310°F. and then paved with a 1 ½ inch lift of hot asphalt concrete while the tack coat was still quite tacky. The asphalt concrete is given a pass with a roller immediately behind the paver. The following morning a second 1 ½ inch lift of asphaltic concrete is applied and rolled.

Conductivity tests indicate the membrane has a very high resistance to electrical current (even when wet on the surface) both before and after paving with the hot asphaltic concrete.

Example 2

The floor of a building in which empty drums (such as 55-gallon drums) are handled is thoroughly scrubbed with a strong soap solution and rinsed thoroughly with water. Compressed air is then used to remove free water from the floor surface which is very clean but contains some residual adsorped water. Forms of ⅛ inch sq. wood are laid in place in doorways and the like as needed to prevent run off.

The floor is allowed to air dry overnight. The adhesion promoter solution, as used in Example 1, is applied with airless spray equipment using a 5-gallon pot pressured with nitrogen and a T-jet spray tip. The application rate is about 250 sq. ft. per gallon.

After the solvent has evaporated the seal coat of Example 1 is applied with rubber squeegees at a rate of about 0.035 gallons per sq. yard. After a short period of time most of the air has escaped from the surface of the concrete and the bubbling has stopped. The membrane coat is applied as in Example 1 using the premix and the Thanate P–220 of Example 1 at a combined rate of 0.67 gallons per sq. yard to give ⅛ inch thickness. The completed job is allowed to cure over the weekend (about 60 hours) and is ready for light foot and forklift traffic. At the end of this time, the membrane contains substantially no bubbles. The noise level is considerably reduced from that experienced prior to the application of this sound deadening layer.

We claim:

1. A surface coated with a cast-in-place surfacing composition comprising, in order, from the surface:
   A. a primer,
   B. A seal coat comprising 15 to 50 parts by weight of a polyurethane, 2 to 10 parts by weight of a dark heat-absorbing filler, 25 to 75 parts by weight of a substantially inert nonvolatile extender selected from the group consisting of cut-back asphalts and extender oils, 0 to 25 parts by weight of a volatile solvent, and 10–40 parts by weight of an inert filler, said polyurethane formed by reacting 10 to 40 parts by weight of a polyurethane precursor with 3 to 12 parts by weight of a polyisocyanate, said polyurethane precursors of said seal coat comprising 8 to 34 parts by weight of a high-molecular-weight polyol and 0 to 8 parts by weight of a low-molecular-weight chain stiffener, and
   C. A membrane coat comprising 20 to 80 parts by weight of a polyurethane, 20 to 80 parts by weight of a substantially inert nonvolatile extender selected from the group consisting of cut-back asphalts and extender oils, and 0 to 20 parts by weight of a volatile solvent, said polyurethane formed by reacting a polyisocyanate with a polyurethane precursor at a mol ratio of 1.1–1.5:1, said polyurethane precursor of said membrane coat comprising 15 to 60 parts by weight of a high-molecular-weight polyol and 2 to 10 parts by weight of a low-molecular-weight chain stiffener.

2. A coated surface of claim 1, wherein said seal coat comprises 25 to 30 parts by weight of said polyurethane, 2 to 5 parts by weight of said dark heat-absorbing filler, 40 to 60 parts by weight of said extender, 0 to 20 parts by weight of said volatile solvent, and 20–30 parts by weight of an inert filler, wherein said polyurethane of said seal coat is formed by reacting 6 to 7.5 parts by weight of a polyisocyanate with 20 to 25 parts by weight of a polyurethane precursor comprising 15 to 20 parts by weight of high-molecular-weight polyol and 0 to 4 parts by weight of a low-molecular-weight chain stiffener, wherein said heat-absorbing filler is carbon black, wherein said membrane coat comprises 40 to 60 parts by weight of said polyurethane, 40 to 60 parts by weight of said extender and 0 to 10 parts by weight of said volatile solvent, wherein said polyurethane of said membrane coat is formed by reacting 10 to 15 parts by weight of a polyisocyanate with 30 to 55 parts by weight of a polyurethane precursor at a mol ratio of 1.1–1.5:1, said polyurethane precursor comprising 30 to 55 parts by weight of a high molecular weight polyol and 4 to 8 parts by weight of a low molecular weight chain stiffener.

3. A coated surface of claim 2, wherein said seal coat has a thickness of 0.01 to 0.05 inch.

4. A coated surface of claim 3, wherein said membrane coat has a thickness of one-fiftieth to one-half inch.

5. A coated surface of claim 4, wherein said high molecular weight polyol has an average molecular weight of 1,800 to 3,000.

6. A coated surface of claim 5, wherein said low-molecular-weight chain stiffener is selected from 1,4-butanediol, 1,4-bis(hydroxymethyl)cyclohexane and N,N,bis(2-hydroxypropyl)aniline.

7. A coated surface of claim 6, wherein said low-molecular-weight chain stiffener is N,N-bis(2-hydroxypropyl)aniline.

8. A coated surface of claim 7, wherein the mol ratio of the isocyanate reactive groups of said low-molecular-weight chain stiffener to the isocyanate reactive groups of said high-molecular-weight polyol is from 1.5 to 2.5:1.

9. A coated surface of claim 8 comprising, in order, from a coated surface:
   A. Said adhesion promoter,
   B. Said seal coat,
   C. Said membrane coat,
   D. A tack coat comprising asphalt, and
   E. A wearing surface coat comprising asphalt concrete.

10. A coated surface of claim 9 wherein the asphalt of said tack coat has a penetration of 70 to 120 and the wearing surface coat has a thickness of ¼ to 6 inches.

11. The coated surface of claim 10, wherein said wearing surface coat has a thickness of 1–4 inches.

12. A process for coating a surface comprising:
   A. Applying a primer to a surface to be coated to promote adhesion,
   B. Applying a seal coat to said primed surface, said seal coat comprising 10 to 40 parts by weight of a polyurethane precursor, 2 to 10 parts by weight of a dark heat-absorbing filler, and 25 to 75 parts by weight of a substantially inert nonvolatile extender selected from the group consisting of cut-back asphalts and extender oils, 0 to 25 parts by weight of a volatile solvent, and 10 to 40 parts by weight of an inert filler, wherein said polyurethane precursor comprises 8 to 34 parts by weight of a high-molecular-weight polyol and 0 to 8 parts by weight of a low-molecular-weight chain stiffener,
   C. Allowing said seal coat to stand for a time sufficient to allow entrained gases to escape from said seal coat and said primed surface,
   D. Applying to the surface of seal coat a membrane-forming coating comprising (1) 15 to 60 parts by weight of a polyurethane precursor, (2) 20 to 80 parts by weight of a substantially inert nonvolatile extender selected from the group consisting of cut-back asphalts and extender oils, (3) 6 to 20 parts by weight of a polyisocyanate, (4) 0 to 20 parts by weight of a volatile solvent, and (5) 0 to 1.0 part by weight of a polyurethane-forming reaction catalyst, wherein said polyurethane precursor comprises 15 to 60 parts by weight of a high-molecularweight polyol and 2 to 10 parts by weight of a low-molecular-weight chain stiffener.

13. The process of claim 12, wherein
A. said seal coat comprises 20 to 25 parts by weight of said polyurethane precursor comprising 15 to 20 parts by weight of said high-molecular-weight polyol and 0 to 4 parts by weight of said low-molecular-weight chain stiffener, 2 to 5 parts by weight of said dark heat-absorbing filler, 40 to 60 parts by weight of said extender, 0 to 20 parts by weight of said volatile solvent, and 20 to 30 parts by weight of said inert filler,
B. Said seal coat is allowed to stand for from ¼ to 4 hours,
C. Said membrane-forming coat comprises (1) 30 to 55 parts by weight of said polyurethane precursor, (2) 40 to 60 parts by weight of said extender, (3) 10 to 15 parts by weight of said polyisocyanate, and (4) 0.01 to 1.0 parts by weight of said catalyst, and said polyurethane precursor comprises 30 to 55 parts by weight of said high-molecular-weight polyol and 4 to 8 parts by weight of said low-molecular-weight chain stiffener.

14. A process for coating a surface comprising:
A. Applying a primer to a surface to be coated to promote adhesion,
B. Applying a seal coat to said primed surface, said seal coat comprising 10 to 40 parts by weight of a polyurethane precursor, 2 to 10 parts by weight of a dark heat-absorbing filler, and 25 to 75 parts by weight of a substantially inert nonvolatile extender selected from the group consisting of cut-back asphalts and extender oils, 0 to 25 parts by weight of a volatile solvent, and 10 to 40 parts by weight of an inert filler, wherein said polyurethane precursor comprises 8 to 34 parts by weight of a high-molecular-weight polyol and 0 to 8 parts by weight of a low-molecular-weight chain stiffener,
C. Allowing said seal coat to stand for a time sufficient to allow entrained gases to escape from said seal coat and said primed surface,
D. Applying to the surface of said seal coat a membrane-forming coating comprising (1) 15 to 60 parts by weight of a polyurethane precursor, (2) 20 to 80 parts by weight of a substantially inert nonvolatile extender selected from the group consisting of cut-back asphalts and extender oils, (3) 6 to 20 parts by weight of a polyisocyanate, (4) 0 to 20 parts by weight of a volatile solvent, and (5) 0 to 1.0 part by weight of a polyurethane-forming reaction catalyst, wherein said polyurethane precursor comprises 15 to 60 parts by weight of a high-molecular-weight polyol and 2 to 10 parts by weight of a low-molecular-weight chain stiffener,
E. Applying to the surface of said membrane-forming coat a tack coat comprising molten asphalt having a penetration of 70 to 110, and
F. Applying to the surface of said tack coat an asphalt concrete comprising 4 to 7 parts by weight of an asphalt having a penetration of 70 to 150 and 96 to 93 parts by weight of a mineral aggregate.

15. The process of claim 14, wherein said asphalt concrete is applied to yield a compacted thickness of ¼ to 6 inches.

* * * * *